United States Patent Office 3,146,206
Patented Aug. 25, 1964

3,146,206
ORGANOSILICON FLUID COMPOSITION
Neal W. Furby, Berkeley, Manuel A. Pino, Oakland, and Robert L. Peeler, Albany, Calif., assignors to California Research Corporation, San Francisco, Calif., a corporation of Delaware
No Drawing. Filed July 18, 1962, Ser. No. 210,844
6 Claims. (Cl. 252—78)

This invention relates to a novel thermally stable organosilicon fluid composition. More particularly, the invention is concerned with a new poly(alkoxy)siloxane-silicone composition that is exceptionally useful as a durable, high-temperature power transmission fluid.

Thermally stable organosilicon fluids which are resistant to decomposition and radical viscosity changes at elevated temperatures are useful in numerous applications. They may be employed as coolants or heat transfer agents in general in heat exchange systems. They are particularly suitable as power transmission fluids in a wide variety of systems operated at higher than normal temperatures.

Systems that rely upon a fluid medium for the transmission of a force are common in today's technology. The fluid that is relied upon to transmit this power must, of course, permit successful operation of the system under the conditions of temperature, pressure, and contamination that may be encountered. Since the operating conditions that are encountered by systems such as those contained in very high performance aircraft and rockets are likely to be severe, it has become necessary to develop fluids that will meet increasingly rigorous military and commercial specifications. These specifications define the minimum acceptable fluid performance with regard to such properties as viscosities at high and low temperatures, rate of change of viscosity with change of temperature, volatility and density, as well as hydrolytic, oxidative and thermal stabilities.

It has now been discovered that hydraulic fluids based on a blend of low viscosity methylphenyl polysilicone and a long chain polysilicate optimize the overall fluid properties listed above. Moreover, the fluids prepared in accordance with this invention admit the incorporation of additives which impart to the final fluid additional desirable properties or improve those already possessed by the blend. Hydraulic fluids present in use, or compositions proposed for such use, while perhaps possessing satisfactory viscosity-temperature relationships are less satisfactory by comparison in that they do not combine superior viscosity-temperature properties with an equally superior shear strength and hydrolytic and thermal stabilities.

In particular, the fluid composition of the present invention is made up of a total of from about 85 to 99.9 percent by weight of poly(alkoxy)siloxane, the alkoxy radical containing 3 to 8 carbon atoms, the siloxane polymer having an average molecular weight of between 1000 and 1600 and consisting predominantly of polymer chains containing at least four monomer units, together with from about 0.1 to 15 percent by weight of methylphenyl silicone polymer having a viscosity of approximately 1,000 to 25,000 centistokes at 25° C. Specific poly(alkoxy)siloxanes within the foregoing description include poly(isopentoxy)siloxane, poly(n-butoxy)siloxane and poly(n-hexoxy)siloxane. Preferred compositions contain 90 to 98 percent poly(alkoxy)siloxane and 2 to 10 percent silicone of 5,000 to 25,000 centistokes viscosity. The alkoxy radicals are preferably from 4 to 6 carbon atoms.

Unexpectedly improved viscosity-temperature characteristics are obtained by the addition of the methylphenyl silicone. The use of a silicone thickener, such as methylethyl silicone having a viscosity of 100,000 centistokes at 25° C., is well known in the art. It is also well known in the art of formulation that fluid thickening is generally achieved by the incorporation of additives which themselves have higher viscosities. For example, a commercial procedure used to improve the V.I. of solvent refined mineral lubricating oil having a viscosity of 5.7 centistokes at 100° C. is to incorporate about 3.5 percent by weight of a high molecular weight polymer such as, for example, polylauryl methacrylate, which is a soft, plastic substance at room temperature. Surprisingly, however, the incorporation of the low viscosity methylphenyl silicone into the poly(alkoxy)siloxane base fluid produces thickening entirely equivalent to that produced by a greater amount of the higher viscosity methylethyl additive, and, at the same time, imparts to the fluid greatly superior shear strength and thermal stability as compared to that obtained by use of the more conventional silicone additives such as methylethyl silicone.

As an example which illustrates the preparation of fluid compositions in accordance with the invention, 96.5 parts by weight poly(isopentoxy)siloxane having a viscosity of about 35 centistokes at 25° C. and an average molecular weight of about 1300 and consisting predominantly of polymer chains containing at least about four monomer units, and 3.5 parts by weight methylphenyl silicone of a viscosity of 18,000 centistokes at 25° C. are mixed. The mixture is heated to about 200° F. and mechanically stirred for 30 minutes to one hour.

The fluid compositions of the present invention display excellent viscosity-temperature characteristics and markedly superior shear, hydrolytic, and thermal stabilities as shown by comparison to a commercially available siloxane-based hydraulic fluid and a mineral oil hydraulic fluid in a number of tests. The tests evaluate viscosity-temperature behavior, hydrolytic stability, shear stability, and thermal stability. In each test the viscosity of the fluids is measured in centistokes at the indicated temperature. For the stability tests the viscosity recorded after applying the test conditions to the fluid indicates the amount of structural change which the polymer undergoes as a result of the test. Thus, the greater the change in viscosity, the more unstable and undesirable the polymer.

The viscosities are determined by ASTM standard method number D445–53T.

Hydrolytic stability is tested under two conditions: Test A requires that the fluid be saturated with water at room temperature by passing moist air through the fluid for 6 hours, sealing the saturated fluid in an ampule, and heated at 400° F. for 120 hours; Test B calls for the simple addition of 1 percent by weight water to the fluid and heating the mixture at 400° F. for 96 hours.

The shear stability measurement is made after the fluid is subjected to shear forces in the form of cavitations induced by sonic oscillations of a frequency of about 10,000 cycles per second for 120 minutes.

Thermal stability is measured by heating the fluids at 600° F. for 6 hours and then observing the change in viscosity.

Hydraulic fluid composition I contains 94.5 percent by weight poly(isopentoxy)siloxane having a viscosity of about 35 centistokes at 25° C., 3.5 percent by weight methylphenyl silicone having a viscosity of 18,000 centistokes at 25° C., and 2.0 percent by weight ditertiary-butyl para-cresol, which acts as an oxidation inhibitor.

Hydraulic fluid composition II contains 94 percent by weight poly(n-butoxy)siloxane having a viscosity of about 26 centistokes at 25° C., 4.0 percent by weight methylphenyl silicone having a viscosity of 18,000 centistokes at 25° C., and 2.0 percent by weight ditertiary butyl para-cresol, which acts as an oxidation inhibitor.

Hydraulic fluid composition III is a commercial high temperature organosilicon hydraulic fluid containing 92.5 percent by weight of a silicate ester base consisting predominantly of hexa-2-ethylbutoxy disiloxane along with higher polysilicates, said mixture having a viscosity of 15.5 centistokes at 25° C., and 5.5 percent methylethyl silicone having a viscosity of 100,000 centistokes at 25° C. and 2 percent by weight dioctyldiphenylamine, acting as an oxidation inhibitor.

Hydraulic fluid composition IV is a mineral oil composition containing a mixture of gas oils, having a viscosity of about 8.0 centistokes at 25° C., and thickened with approximately 7.5 percent by weight polyoctyl methacrylate, which is a soft, plastic substance at room temperature.

*Table 1*

| Temperature, °F. | Hydraulic fluid—Viscosity, centistokes (percent change in viscosity) | | | |
|---|---|---|---|---|
| | I | II | III | IV |
| Viscosity-temperature performance. 400 | 3.7 | 3.9 | 3.8 | 1.9 |
| 210 | 11.4 | 11.5 | 11.3 | 5.0 |
| 100 | 33.7 | 31.0 | 32.5 | 15 |
| −65 | 2,600 | 1,210 | 2,300 | 2,500 |
| Hydrolytic stability: | | | | |
| Test A 210 | 10.0 (−12%) | 10.3 (−11.6%) | 8.1 (−28%) | |
| Test B 210 | 10.3 (−9.6%) | 11.96 (+2.1%) | 4.3 (−62%) | |
| Shear stability 210 | 9.5 (−16%) | 8.9 (−21.6%) | 7.7 (−32%) | 2.7 (−46%) |
| Thermal stability 210 | 9.7 (−15%) | | 5.0 (−56%) | |

As can be seen from the above table, fluids I and II of this invention achieve satisfactory viscosity-temperature performance through the use of less silicone additive than does fluid composition III. Specifically, fluid I contains 36 percent by weight less silicone additive and fluid II contains 27 percent less silicone additive than does fluid III. Also, the fluids of the present invention are markedly superior to the mineral oil composition IV in viscosity-temperature performance. Further, it can be seen that the instant polysiloxane fluid compositions display at least 50 percent greater hydrolytic, shear, or thermal stability as compared to compositions III and IV as measured by the percent change in viscosities.

Still further examples of long chain poly(alkoxy)siloxane and low viscosity methylphenyl silicone blends of the invention are given in Table 2 below. Illustrative data are included to show the superior viscosity characteristics of the compositions.

satisfactory to render them useful as a hydraulic fluid meeting the most stringent requirements, it will be obvious to those skilled in the art that other additives such as anti-wear and anti-rust agents, oxidation and corrosion inhibitors, etc., may be incorporated into the blend to improve one or more of the properties thereof. Other known fluids having recognized desirable properties may also be employed in the blend, such as for example synthetic oils of the diester type (di-2-ethylhexylsebacate). Similarly, it will occur to those skilled in the art that the properties of the present invention are such as to render it useful in applications other than as a power transmission fluid. For example, this fluid may be used as a special purpose lubricant as in the lubrication of machine guns or aircraft instruments.

This application is a continuation-in-part of U.S. patent application Serial No. 58,190, filed September 26, 1960, and now abandoned, by Neal W. Furby, Manuel A. Pino and Robert L. Peeler.

We claim:

1. A thermally stable fluid composition containing 85 to 99.9 percent by weight poly(alkoxy)siloxane, the alkoxy radical containing 3 to 8 carbon atoms, the siloxane polymer having an average molecular weight of between 1000 and 1600 and consisting predominantly of polymer chains containing at least about 4 monomer units and 0.1 to 15 percent by weight methylphenyl silicone having a viscosity of about 1,000 to 25,000 centistokes at 25° C.

2. A thermally stable fluid composition containing 90 to 98 percent by weight poly(isophentoxy)siloxane having a viscosity of about 35 centistokes at 25° C. and an average molecular weight of about 1300 and consisting predominantly of polymer chains containing at least about 4 monomer units and 2 to 10 percent by weight methylphenyl silicone having a viscosity of about 5,000 to 25,000 centistokes at 25° C.

3. A thermally stable fluid composition containing 90 to 98 percent by weight poly(n-butoxy) siloxane having a viscosity of about 26 centistokes at 25° C. and an average molecular weight of about 1300 and consisting predominantly of polymer chains containing at least about 4 monomer units and 2 to 10 percent by weight methylphenyl silicone having a viscosity of about 5,000 to 25,000 centistokes at 25° C.

4. A thermally stable fluid composition containing 85 to 99.9 percent by weight poly(isopentoxy)siloxane, the siloxane polymer having an average molecular weight of between 1000 and 1600 and consisting predominantly of polymer chains containing at least about 4 monomer units

*Table 2*

| Hydraulic fluid composition No. | Poly(alkoxy)siloxane | | | | | | Methylphenyl silicone | | Mixture, viscosity, cs. | | | |
|---|---|---|---|---|---|---|---|---|---|---|---|---|
| | Alkyl group | Molecular weight | Viscosity, cs. | | | | Amt., percent, by wt. | Viscosity, cs., 25° C. | Amt., percent, by wt. | −65° F. | 100° F. | 210° F. | 400° F. |
| | | | −65° F. | 100° F. | 210° F. | 400° F. | | | | | | | |
| V | Butyl | 1,150 | 875 | 21.8 | 7.75 | 2.46 | 95 | 1,000 | 5 | 1,285 | 27.1 | 9.58 | 3.14 |
| VI | do | 1,150 | 875 | 21.8 | 7.75 | 2.46 | 90 | 1,000 | 10 | 1,620 | 35.4 | 12.64 | 4.21 |
| VII | do | 1,150 | 875 | 21.8 | 7.75 | 2.46 | 95 | 5,000 | 5 | 1,516 | 32.3 | 11.43 | 3.78 |
| VIII | do | 1,150 | 875 | 21.8 | 7.75 | 2.46 | 90 | 5,000 | 10 | 2,253 | 49.4 | 17.64 | 5.85 |
| IX | do | 1,150 | 875 | 21.8 | 7.75 | 2.46 | 95 | 18,000 | 5 | 1,679 | 37.1 | 13.36 | 4.45 |
| X | n-Hexyl | 1,479 | | 16.7 | 5.55 | 1.75 | 99 | 18,000 | 1 | | 18.3 | 6.18 | |
| XI | do | 1,479 | | 16.7 | 5.55 | 1.75 | 99 | ¹100,000 | 1 | | 17.3 | 5.89 | |

¹ Methylethyl Silicone (for comparison).

On the basis of the specific examples of Table 1 and Table 2 it is seen that the poly(alkoxy)siloxane and methylphenyl silicone compositions of the present invention provide thermally stable fluid compositions having outstanding viscosity characteristics.

Although the compositions of the present invention possess the above-discussed fluid properties to a degree and 0.1 to 15 percent by weight methylphenyl silicone having a viscosity of about 1,000 to 25,000 centistokes at 25° C.

5. A thermally stable fluid composition containing 85 to 99.9 percent by weight poly(n-butoxy)siloxane, the siloxane polymer having an average molecular weight of between 1000 and 1600 and consisting predominantly of polymer chains containing at least about 4 monomer units and 0.1 to 15 percent by weight methylphenyl silicone having a viscosity of about 1,000 to 25,000 centistokes at 25° C.

6. A thermally stable fluid composition containing 85 to 99.9 percent by weight poly(n-hexoxy)siloxane, the siloxane polymer having an average molecular weight of between 1000 and 1600 and consisting predominantly of polymer chains containing at least about 4 monomer units and 0.1 to 15 percent by weight methylphenyl silicone having a viscosity of about 1,000 to 25,000 centistokes at 25° C.

References Cited in the file of this patent

UNITED STATES PATENTS

| | | |
|---|---|---|
| 2,467,178 | Zimmer et al. | Apr. 12, 1949 |
| 2,658,908 | Nitzsche et al. | Nov. 10, 1953 |
| 2,681,313 | Katner et al. | June 15, 1954 |
| 2,693,451 | Heisig | Nov. 2, 1954 |
| 2,746,926 | Barry | May 22, 1956 |
| 2,870,184 | Wright | Jan. 20, 1959 |